(12) United States Patent
Petersson et al.

(10) Patent No.: US 11,139,870 B2
(45) Date of Patent: Oct. 5, 2021

(54) TRANSMISSION OF REFERENCE SIGNALS FROM A TERMINAL DEVICE

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Gothenburg (SE); Roy Timo, Järfälla (SE); Xinlin Zhang, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 206 days.

(21) Appl. No.: 16/466,242

(22) PCT Filed: Apr. 29, 2019

(86) PCT No.: PCT/EP2019/060946
§ 371 (c)(1),
(2) Date: Jun. 3, 2019

(87) PCT Pub. No.: WO2020/221424
PCT Pub. Date: Nov. 5, 2020

(65) Prior Publication Data
US 2021/0135719 A1    May 6, 2021

(51) Int. Cl.
*H04B 7/04*         (2017.01)
*H04B 7/0456*       (2017.01)
*H04B 7/06*         (2006.01)
*H04L 5/00*         (2006.01)

(52) U.S. Cl.
CPC ......... *H04B 7/0469* (2013.01); *H04B 7/0639* (2013.01); *H04L 5/0051* (2013.01)

(58) Field of Classification Search
CPC .... H04L 5/0051; H04B 7/0639; H04B 7/0469
See application file for complete search history.

(56) References Cited

U.S. PATENT DOCUMENTS

| 2013/0202058 | A1* | 8/2013 | Asplund | ........... H04L 25/03343 375/295 |
|---|---|---|---|---|
| 2016/0087701 | A1 | 3/2016 | Wu et al. | |
| 2018/0167252 | A1 | 6/2018 | Wang et al. | |
| 2018/0294847 | A1 | 10/2018 | Lee et al. | |

(Continued)

FOREIGN PATENT DOCUMENTS

| CN | 108111283 A | 6/2018 |
|---|---|---|
| WO | 2012053948 A1 | 4/2012 |

OTHER PUBLICATIONS

International Search Report issued in International Application No. PCT/EP2019/060946, dated Dec. 16, 2019 (5 pages).

(Continued)

*Primary Examiner* — Nader Bolourchi
(74) *Attorney, Agent, or Firm* — Rothwell, Figg, Ernst & Manbeck, P.C.

(57) ABSTRACT

There is provided mechanisms for transmission of reference signals. A method is performed by a terminal device. The terminal device is configured for codebook based precoding. The terminal device comprises at least two physical antenna ports. The method comprises transmitting, in all physical antenna port, as many uplink reference signals as there are physical antenna ports in total.

20 Claims, 6 Drawing Sheets

(56) References Cited

U.S. PATENT DOCUMENTS

2018/0309490 A1    10/2018  Rahman et al.
2019/0007112 A1     1/2019  Faxér et al.
2020/0220592 A1*    7/2020  Ryu .................... H04B 7/0456

OTHER PUBLICATIONS

Written Opinion of the ISA issued in International Application No. PCT/EP2019/060946, dated Dec. 16, 2019 (8 pages).
3GPP TSG RAN WG1 Meeting #96-bis (R1-1904847), Ericsson, "On full power UL transmission", Xi'an, China, Apr. 8-12, 2019 (22 pages).
3GPP TSG-RAN WG1 #88 (R1-1703225), Ericsson, "On codebook based UL MIMO transmission with precoded SRS", Athens, Greece, Feb. 13-17, 2017 (5 pages).

\* cited by examiner

TRANSMISSION OF REFERENCE SIGNALS FROM A TERMINAL DEVICE

CROSS REFERENCE TO RELATED APPLICATION(S)

This application is a 35 U.S.C. § 371 National Stage of International Patent Application No. PCT/EP2019/060946, filed Apr. 29, 2019, designating the United States.

TECHNICAL FIELD

Embodiments presented herein relate to a method, a terminal device, a computer program, and a computer program product for transmission of reference signals.

BACKGROUND

In communications networks, there may be a challenge to obtain good performance and capacity for a given communications protocol, its parameters and the physical environment in which the communications network is deployed.

For example, multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly simply referred to as MIMO.

In the fifth generation (5G) New radio (NR) air interface, support is provided in the uplink (i.e., from served terminal device to serving radio access network node) for MIMO with up to 4 layer spatial multiplexing using at least 4 physical antenna ports with channel dependent precoding. The spatial multiplexing mode is aimed for high data rates in favorable channel conditions.

In more detail, the information carrying symbol vector s is multiplied by an $N_T$-by-r precoder matrix W, which serves to distribute the transmit energy in a subspace of the $N_T$ (corresponding to the $N_T$ physical antenna ports) dimensional vector space. The precoder matrix is typically selected from a codebook of possible precoder matrices, and is typically indicated by means of a transmit precoder matrix indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

In codebook based precoding for the uplink of 5G NR air interface, the radio access network node starts with configuring the terminal device to transmit uplink reference signals according to the number of antenna ports it would like the terminal device to use for uplink transmission to enable channel measurements. The radio access network node transmits, based on the channel measurements of the received uplink reference signals, the TPMI to the terminal device that the terminal device should use on the antenna ports. A single precoder that is supposed to cover a large bandwidth (wideband precoding) may be signaled.

Other information than TPMI is generally used by the radio access network node to determine the uplink MIMO transmission state, such as uplink reference signal resource indicators (SRIs) as well as transmission rank indicator (TRIs). These parameters, as well as the modulation and coding state (MCS), and the uplink resources where the uplink data is to be transmitted, are also determined by channel measurements derived from transmission of uplink reference signals from the terminal device. The transmission rank, and thus the number of spatially multiplexed layers, is reflected in the number of columns of the precoder W. For efficient performance, it is important that a transmission rank that matches the channel properties is selected.

Depending on terminal device implementation, it may be possible to maintain the relative phase of the transmit chains of an antenna array (assuming for example one radio chain per antenna element). In this case, the terminal device is enabled to transmit the same modulation symbol over multiple transmit chains with individual gain and/or phase per transmit chain and in this way forming a beam over the corresponding antenna array. This transmission of a common modulation symbol or signal on multiple antenna elements with controlled phase is referred to as coherent transmission. The support for coherent uplink MIMO transmission in Release 10 of the Long Term Evolution (LTE) suite of telecommunication standards is indicated via a feature group indication for relative transmit phase continuity for uplink spatial multiplexing, wherein a terminal device indicates if it can adequately maintain the relative phase of transmit chains over time in order to support coherent transmission.

In other terminal device implementations, the relative phase of the transmit chains may not be well controlled, and coherent transmission may not be used. In such implementations, it may still be possible for the terminal device to transmit on one of the transmit chains at a time, or to transmit different modulation symbols on the transmit chains. In the latter case, the modulation symbols on each transmit chain may form a spatially multiplexed, or MIMO, layer. This class of transmission is referred to as non-coherent transmission.

In still other terminal device implementations, the relative phase of a subset of the transmit chains is well controlled, but not over all transmit chains. One possible example is described above with respect to multi-panel operation, where phase is well controlled among transmit chains within a panel, but phase between panels is not well controlled. This class of transmission is referred to as partially-coherent.

All three of these variants of relative phase control have been agreed to be supported for transmission over the 5G NR air interface, and so terminal device capabilities have been defined for full coherence, partial coherence, and non-coherent transmission. Depending on coherence capability of the terminal device, it is possible to configure the terminal device with three different combinations of codebook subsets. FIG. 1 illustrates three different codebook subsets 10, 20, 30 for rank 1 precoders. Codebook subset 10 is referred to as non-coherent and only consists of antenna selection precoders. Codebook subset 20 is referred to as partial-coherent and only consists of antenna pair selection precoders. Codebook subset 30 is referred to as fully-coherent and only consists of full linear combining precoders. Depending on the terminal device coherence capability, the radio access network node can configure the terminal device with three different combinations of the codebook subsets. For non-coherent terminal devices, the radio access network node is expected to configure the terminal device with only the non-coherent codebook subset 10. For partially-coherent terminal devices, the radio access network node is expected to configure the terminal device with both the non-coherent and the partial-coherent codebook subsets 10, 20, and for fully-coherent terminal devices, the radio access network node is expected to configure the terminal device with all three codebook subsets 10, 20, 30.

At lower frequencies (such as below 6 GHz) it is expected that the terminal device has a pure digital antenna implementation, with one baseband port, or physical antenna port, per physical antenna (compared to mmWave frequencies where the terminal devices are expected to (at least initially) have antenna panel implementations with analog beamforming within each antenna panel). As an illustrative example, assume a terminal device equipped with four physical antenna ports and four physical antennas with antenna elements pointing in different directions. Depending on the carrier frequencies the antenna element patterns are expected to be more or less directional. For lower frequencies the antenna patterns are typically fairly omni-directional, but when the carrier frequency increases the antenna element pattern typically becomes more and more directional.

It is expected that the maximum allowed output power radiated from the terminal device for transmission at below 6 GHz will be 23 dBm. For cost and energy efficiency reasons it is preferred to in the terminal device have power amplifiers (PAs) with as low maximum output power as possible. One reason for this is that the energy efficiency of the PA is reduced the larger the difference is between the applied output power and the maximum supported output power of the PA, which will drain the battery of the terminal device.

As an example, for a terminal device equipped with four physical antennas, each fed by its own PA, it is enough that each PA can transmit with a maximal output power of 17 dBm for the terminal device to reach the maximum output power of 23 dBm. However, this requires that the terminal device transmits on all four physical antennas, which in some cases is not optimal, for example if one physical antenna is blocked or pointing in the wrong direction. Also for non-coherent terminal devices, the terminal device can only use antenna selection precoders 10, which means that if the terminal device transmits single layer transmission, only one physical antenna can be used and hence the maximum possible output power will be 17 dBm. One way to mitigate this is to use one PA with 23 dB maximum output power and having the remaining three PAs with 17 dBm output power. In this way it is still possible to transmit single layer transmission on one physical antenna and reach the maximum allowed output power of 23 dBm, whilst still keeping the cost and energy efficiency of the PA architecture as high as possible.

For a fully coherent terminal device with codebook based transmission, the maximum allowed output power may be reduced due to power scaling when applying port selection precoders. In case the terminal has one or more PAs configured for a maximum of 23 dBm and has directional antennas, the coverage in some cases would be reduced with as much as 6 dB for a terminal device with four physical antenna ports for single layer transmission due to the power scaling. In turn, this might have a negative impact on the performance of uplink transmission of data.

Hence, there is still a need for mechanisms that could improve the coverage and user throughput for terminal devices in the uplink.

SUMMARY

An object of embodiments herein is to provide an efficient mechanism that improves the coverage and user throughput for terminal devices in the uplink, not suffering from the above noted issues, or at least where the above issues are mitigated or reduced.

According to a first aspect there is presented a method for transmission of reference signals. The method is performed by a terminal device. The terminal device is configured for codebook based precoding. The terminal device comprises at least two physical antenna ports. The method comprises transmitting, in all physical antenna port, as many uplink reference signals as there are physical antenna ports in total.

According to a second aspect there is presented a terminal device for transmission of reference signals. The terminal device is configured for codebook based precoding. The terminal device comprises at least two physical antenna ports. The terminal device further comprises processing circuitry. The processing circuitry is configured to cause the terminal device to transmit, in all physical antenna port, as many uplink reference signals as there are physical antenna ports in total.

According to a third aspect there is presented a terminal device for transmission of reference signals. The terminal device is configured for codebook based precoding. The terminal device comprises at least two physical antenna ports. The terminal device further comprises a transmit module configured to transmit, in all physical antenna port, as many uplink reference signals as there are physical antenna ports in total.

According to a fourth aspect there is presented a computer program for transmission of reference signals, the computer program comprising computer program code which, when run on a terminal device being configured for codebook based precoding and comprising at least two physical antenna ports, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously the disclosed transmission of reference signals enables improvements of the coverage and user throughput for the terminal device in the uplink.

Advantageously this enables fully coherent terminal devices to increase their output power for upcoming uplink transmission of data in a single physical antenna port.

Advantageously this will improve the uplink coverage and uplink user throughput.

Advantageously, for a terminal device equipped with physical antennas pointing in different directions, this might improve the link budget up to 3 dB for a terminal device with two physical antenna ports and with up to 6 dB for a terminal device with four physical antenna ports.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

Figure 1:
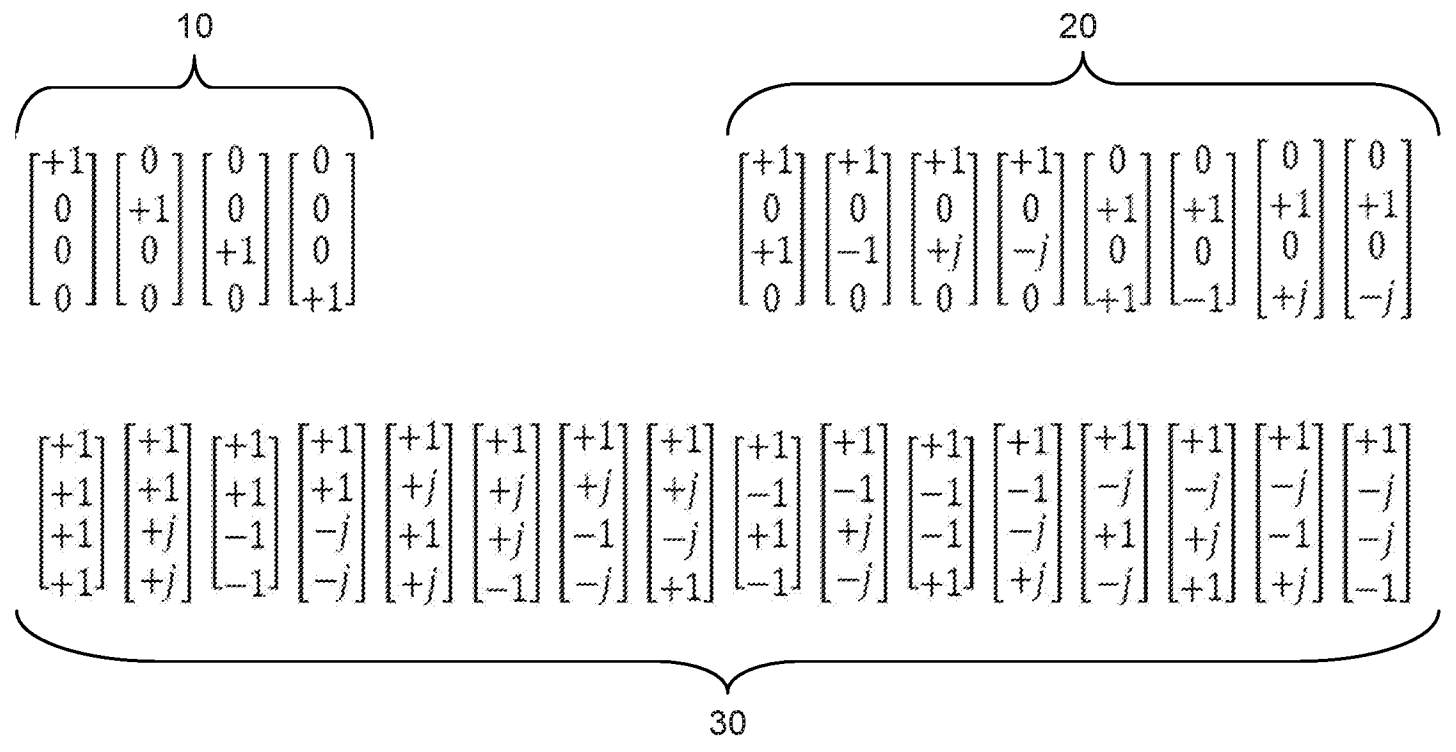

FIG. 1 schematically illustrates precoders;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
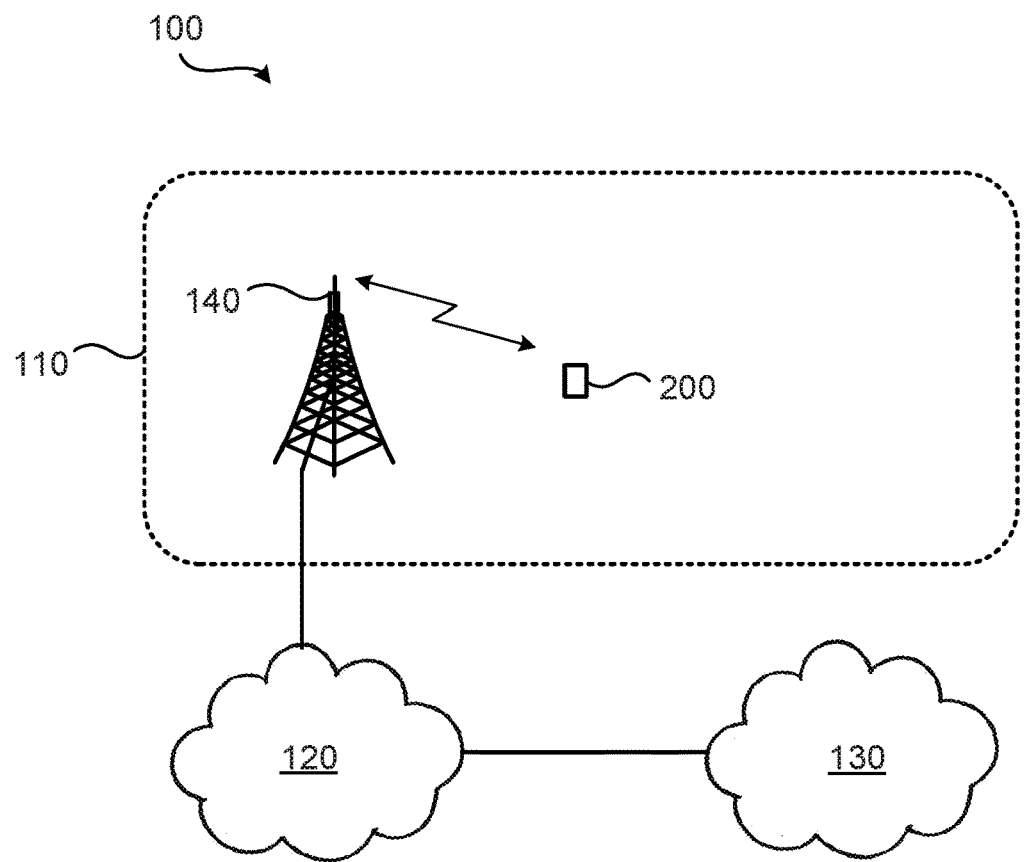
FIG. 2 is a schematic diagram illustrating a communication system according to embodiments.

FIG. 2 is a schematic diagram illustrating a communication system 100 where embodiments presented herein can be applied. The communications system 100 comprises a radio access network node 140 configured to provide network access over one or more radio propagation channels to a terminal device 200 in a radio access network 110. Non-limited examples of terminal devices 200 are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. In some embodiments the radio access network node 140 is part of, integrated with, or collocated with a radio base station, base transceiver station, node B, evolved node B, gNB, access point, or the like. The radio access network 110 is operatively connected to a core network 120. The core network 120 is in turn operatively connected to a packet data network 130, such as the Internet. The terminal device 200 is thereby, via the radio access network node 140, enabled to access services of, and exchange data with, the service network 130.

Figure 3:
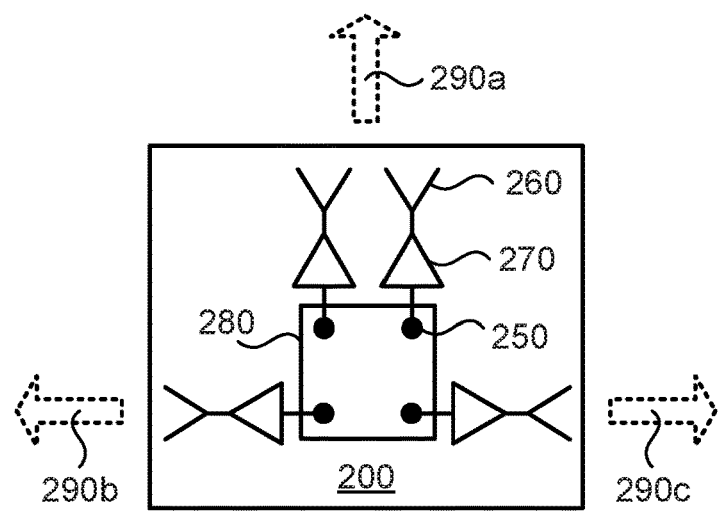
FIG. 3 schematically illustrates a terminal device according to an embodiment.

FIG. 3 schematically illustrates a terminal device 200 equipped with four physical antennas 260. As the skilled person understands, these are just examples and the terminal device 200 might be equipped with more (or less) physical antennas 260. Each physical antenna 260 has its own power amplifier (PA) 270. That is, each physical antenna port 250 is fed by its own PA 270. Each physical antenna 260 is connected to baseband circuitry 280 via its own physical antenna port 250. Thereby, when the terminal device 200 transmits reference signals, each of the reference signals comes from a respective one of the physical antenna ports 250. In some aspects the terminal device 200 has four or eight physical antenna ports 250 in total (depending on the number of physical antennas 260). Although each physical antenna 260 in FIG. 3 is illustrated as comprising only one single antenna element, as the skilled person understands, each physical antenna 260 might be implemented as an array of antenna elements. That is, each physical antenna port 250 could be operatively connected to only a single antenna element or an array of at least two antenna elements. In the illustrative example of FIG. 3, the antenna element or array of at least two antenna elements of at least two of the physical antenna ports 250 are arranged at the terminal device 200 to point in at least two mutually different pointing directions 290a, 290b, 290c. Two of the physical antennas 260 point in direction 290a, and a respective one of the physical antennas 260 points in directions 290b and 290c.

As noted above, there is a need for mechanisms that could improve the coverage and user throughput for terminal devices in the uplink (i.e. from terminal device 200 towards radio access network node 140).

In more detail, regulatory requirements on emissions for terminal devices 200 at comparatively high frequencies state a limit on field strength per unit area. Hence, it could be beneficial to spread the output power over the antenna aperture as much as possible to maximize the allowed output power. Also, too high power transmitted from a single antenna (or panel) might cause local overheating at the terminal device 200.

Further, in the 3GPP specifications for NR, the output power for PUSCH (denoted $P_{PUSCH}$) is not only based on the output power (denoted P) defined from the power control loop of the terminal device 200, but it is also scaled with the ratio between the number of antenna ports with a non-zero PUSCH transmission and the number of configured antenna ports.

The definition of "antenna port" is different for codebook based and non-codebook based UL transmission. For codebook based UL transmission the "antenna port" can more or less be seen as a physical antenna port for sub 6 GHz (as long as no sub-arrays are used). This means, for example, that if a terminal device 200 is configured with four physical antenna ports and it uses a precoder for PUSCH that only utilizes one out of the four physical antenna ports, then the PUSCH output power should be: $P_{PUSCH}=P \cdot 1/4=P/4$. This means, for example, that if P is equal to $P_{max}$ (i.e. 23 dBm), only a quarter of the maximal output power (i.e. 17 dBm) can actually be used for the uplink data transmission for this precoder. This leads to inefficient output power usage for codebook base uplink transmission, when applying antenna selection or antenna pair selection precoders. For example, when it comes to fully coherent terminal devices, when using NR power scaling, the output power will be reduced to a quarter of the maximum allowed output power when applying single antenna selection precoders for a terminal device with four physical antenna ports.

Assume that at least the PA connected to one of the physical antenna ports (AP1) has a maximum allowed output power of 23 dBm and that the PAs of the remaining physical antenna ports might have a maximum allowed output power of 17 dBm or 23 dBm. Assume further that the radio access network node 140 only has a strong path gain to AP1. Currently, the terminal device 200 will transmit one uplink reference signal port (hereinafter uplink reference signal for short) per physical antenna port, see also FIG. 5(a) as described in more detail below. In this case the radio access network node 140 will select a port selection precoder that allows the terminal device 200 to transmit uplink data only in AP1. However, due to the power scaling, the terminal device 200 is only allowed to transmit with 17 dBm for AP1 when using a port selection precoder.

The embodiments disclosed herein therefore relate to mechanisms for transmission of reference signals. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 4:
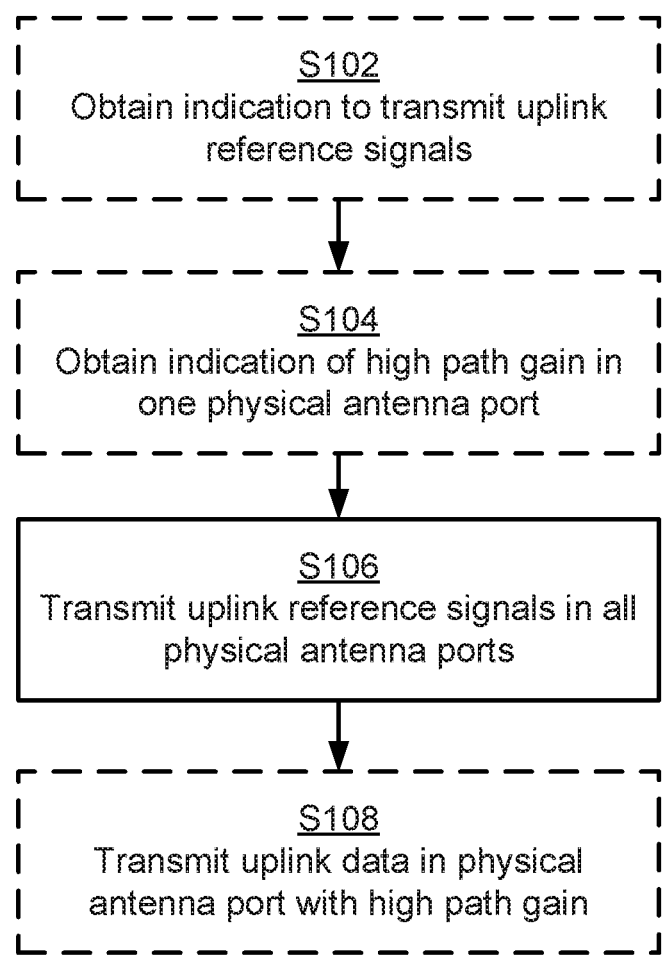
FIG. 4 is a flowchart of methods according to embodiments.

FIG. 4 is a flowchart illustrating embodiments of methods for transmission of reference signals. The methods are performed by the terminal device 200. The terminal device 200 is configured for codebook based precoding. The terminal device 200 comprises at least two physical antenna ports 250. The methods are advantageously provided as computer programs 920.

For codebook based UL transmission, instead of transmitting one uplink reference signal per physical antenna port the terminal device 200 performs a mapping of the uplink reference signals over the physical antenna ports in a way that enables the terminal device 200 to use full output power for upcoming uplink data transmission using only a single physical antenna port. In order to do so the terminal device 200 transmits all uplink reference signals in all physical antenna ports. That is, the terminal device 200 is configured to perform step S106:

S106: The terminal device 200 transmits, in all physical antenna port 250, as many uplink reference signals as there are physical antenna ports 250 in total.

Thereby, when a fully coherent terminal device, which experiences issues with coverage, is configured with codebook based uplink transmission and notices that only the antennas of one of the physical antenna ports have a strong path to the serving radio access network node 140 (and the PA of this physical antenna port is capable of sufficient high output power), instead of transmitting one uplink reference signal per physical antenna port (as is typically done in codebook based uplink transmission) the terminal device 200 transmits all the uplink reference signals in all the physical antenna ports, such that the radio access network node 140 will select a fully coherent precoder in the codebook, resulting in the upcoming uplink transmission of data being performed using only a single physical antenna port. Since full linear combining precoders are allowed to use all available output power at the terminal device (currently up to a limit of 23 dBm) for power scaling, the terminal device is allowed to perform uplink transmission of data using only a single physical antenna port with full output power.

Figure 5:
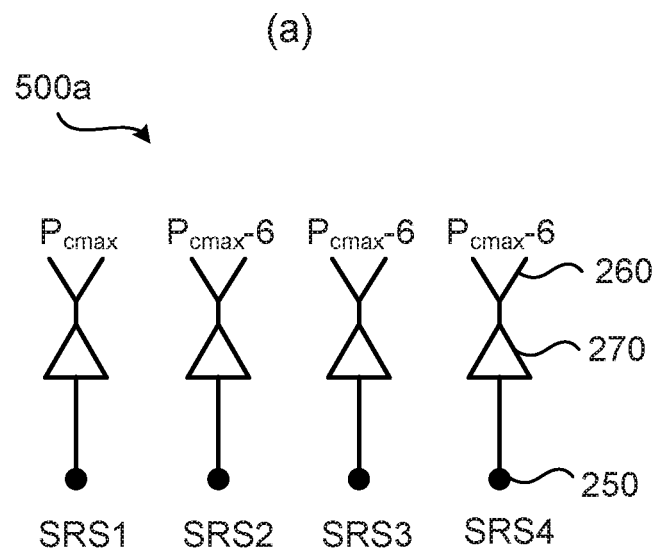
FIG. 5 schematically illustrates transmission of reference signals in antenna ports.
Figure 5:
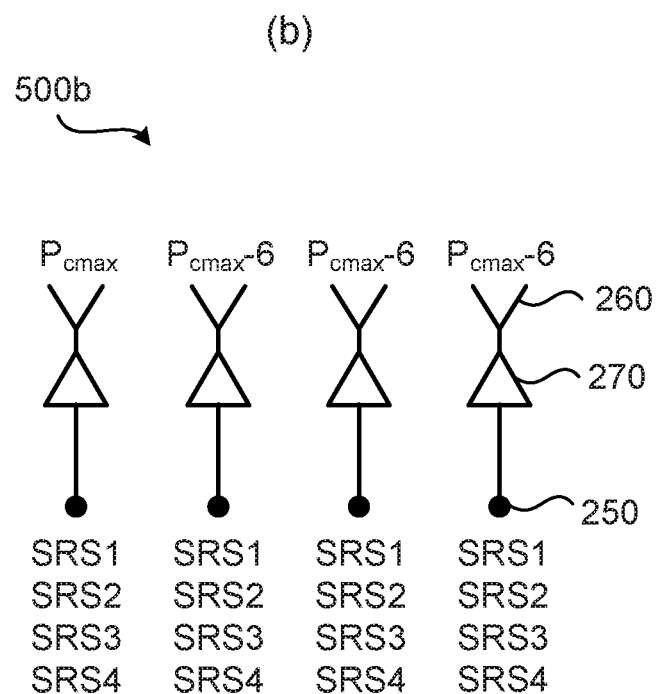

Parallel reference is here made to FIG. 5. FIG. 5 illustrates at (a) transmission of uplink reference signals SRS1, SRS2, SRS3, SRS4 according to prior art and at (b) transmission of the same uplink reference signals SRS1, SRS2, SRS3, SRS4 according to an embodiment as herein disclosed. At 500a is illustrated an antenna arrangement where each physical antenna port is fed with its own signal. Hence, one respective individual reference signal is transmitted in each physical antenna port 250. At 500b is illustrated an antenna arrangement where all reference signals SRS1, SRS2, SRS3, SRS4 are transmitted in all physical antenna ports 250.

Embodiments relating to further details of transmission of reference signals as performed by the terminal device 200 will now be disclosed.

As noted above, the terminal device 200 is configured for codebook based precoding. Particularly, according to an embodiment the terminal device 200 is, according to the codebook based precoding, configured to use a codebook comprising antenna selection precoders 10, antenna pair selection precoders 20, and full linear combining precoders 30. According to a further embodiment, each physical antenna port 250 has its own transmit radio chain, and wherein the terminal device 200 is configured to control relative phase of the transmit radio chains. These are examples of properties of a fully coherent terminal device. Hence, in some aspects the terminal device 200 is a fully coherent terminal device.

In general terms, the mapping from uplink reference signals to physical antenna ports can be expressed according to a matrix relation. Assume that there are M>1 physical antenna ports 250 in total, and assume that M uplink reference signals SRS 1, SRS 2, . . . , SRS M are to be transmitted from M physical antenna ports AP 1, AP 2, . . . , AP M. Then, the uplink reference signals SRS 1, SRS 2, . . . , SRS M could be mapped to the physical antenna ports AP 1, AP 2, . . . , AP M according to:

$$\begin{pmatrix} AP\ 1 \\ AP\ 2 \\ \vdots \\ AP\ M \end{pmatrix} = W \begin{pmatrix} SRS\ 1 \\ SRS\ 2 \\ \vdots \\ SRS\ M \end{pmatrix},$$

where W is an M by M matrix.

The matrix W could thus be characterized as describing the virtualization between uplink reference signals ports and physical antenna ports. Aspects of how to select the matrix W will now be disclosed.

In general terms, W is selected such that the following properties are fulfilled. First, when any rank 1 full linear precoder from the fully coherent codebook is multiplied with the virtualization matrix W, then there will be only one non-zero element in the resulting vector (where the resulting vector is equal to the output power per physical antenna port), and the remaining elements of the resulting vector will be zero. Second, the norm should be the same for each column in W. Examples of matrices W fulfilling these properties will be given next.

According to an embodiment, W has coefficients with unit amplitude in only one single row and in all other rows has coefficients with less than unit amplitude and where the coefficients within each of said all other rows have same amplitude.

According to an embodiment, W has all ones in only one single row and in all other rows W has coefficients selected from the set $\{-\alpha, +\alpha\}$. In some examples there are equally many occurring instances of $-\alpha$ and $+\alpha$ in each of said all other rows.

As a first example, assume that M=4. Then, there are thus four physical antenna ports 250 in total, and the uplink reference signals SRS 1, SRS 2, SRS 3, SRS 4 are transmitted from the physical antenna ports AP 1, AP 2, AP 3, AP 4 according to:

$$\begin{pmatrix} AP\ 1 \\ AP\ 2 \\ AP\ 3 \\ AP\ 4 \end{pmatrix} = W \begin{pmatrix} SRS\ 1 \\ SRS\ 2 \\ SRS\ 3 \\ SRS\ 4 \end{pmatrix}.$$

According to an embodiment, W is selected according to:

$$W = \begin{pmatrix} 1 & 1 & 1 & 1 \\ \alpha & -\alpha & \alpha & -\alpha \\ \alpha & \alpha & -\alpha & -\alpha \\ \alpha & -\alpha & -\alpha & \alpha \end{pmatrix}$$

or any row-wise permutations thereof.

According to another embodiment, W is selected according to:

$$W = \begin{pmatrix} 1 & 1 & 1 & 1 \\ \beta & -\beta & \beta & -\beta \\ \alpha & \alpha & -\alpha & -\alpha \\ \alpha & -\alpha & -\alpha & \alpha \end{pmatrix}$$

or any row-wise permutations thereof, where $0<\alpha\le 1$, and $0<\beta\le 1$. It is also possible to replace all $\alpha$:s in the third and/or fourth row with $\beta$:s, or to replace all $\alpha$:s in the third and/or fourth row with $\gamma$:s, where $0<\gamma\le 1$.

As a second example, assume that M=2. Then, there are thus two physical antenna ports 250 in total, and the uplink reference signals SRS 1, SRS 2 are transmitted from the physical antenna ports AP 1, AP 2 according to:

$$\begin{pmatrix} AP\ 1 \\ AP\ 2 \end{pmatrix} = W \begin{pmatrix} SRS\ 1 \\ SRS\ 2 \end{pmatrix}.$$

According to an embodiment W is selected according to:

$$W = \begin{pmatrix} 1 & 1 \\ \alpha & -\alpha \end{pmatrix}$$

or any row-wise permutations thereof.

There could be different ways to select the value of $\alpha$.

In some aspects, the output power for each uplink reference signal is to be spread equally over all the antenna ports 250. This corresponds to an embodiment where $\alpha=1$.

In some aspects, the output power for each uplink reference signal is to be spread unequally over all the antenna ports 250. This corresponds to an embodiment where $0<\alpha<1$.

The same properties as disclosed for a apply also for $\beta$ and $\gamma$.

With $0<\alpha<1$, more output power is distributed to the antenna port corresponding to the row with all ones in W than to the other antenna ports. The antenna port corresponding to the row with all ones might then be the antenna port for which the highest path gain is experienced.

That is, according to an embodiment, when higher path gain is experienced in one of the physical antenna ports 250 than in the remaining physical antenna ports 250, W has coefficients of unit amplitude only in the row corresponding to the physical antenna ports (250) with higher path gain. The matrix W might thus (if needed) be row-wise permuted such that the row with coefficients of unit amplitude corresponds to the physical antenna ports 250 with higher path gain.

There could be different reasons for the terminal device 200 to transmit the uplink reference signals in step S106.

In some aspects the terminal device 200 is triggered by the radio access network node 140 to transmit the uplink reference signals. Particularly, according to an embodiment, the terminal device 200 is configured to perform (optional) step S102:

S102: The terminal device 200 obtains an indication from a radio access network node 140 for the terminal device 200 to transmit the uplink reference signals. The uplink reference signals are then transmitted in response thereto. That is, the uplink reference signals are transmitted in step S106 in response to the terminal device 200 having obtained the indication in step S102.

In some aspects the terminal device 200 is triggered by an indication of high path gain in one of the physical antenna ports 250 to transmit the uplink reference signals. Particularly, according to an embodiment, the terminal device 200 is configured to perform (optional) step S104:

S104: The terminal device 200 obtains an indication of higher path gain being experienced in one of the physical antenna ports 250 than in the remaining physical antenna ports 250. The uplink reference signals are then transmitted in response thereto. That is, the uplink reference signals are transmitted in step S106 in response to the terminal device 200 having obtained the indication in step S104.

In some aspects, uplink data transmission from the terminal device 200 following the transmission of the reference signals will utilize the same physical antenna port 250 for which the higher path gain was experienced. Particularly, according to an embodiment, the terminal device 200 is configured to perform (optional) step S108:

S108: The terminal device 200 transmits, in only the physical antenna port 250 experiencing the higher path gain, uplink data.

Referring to the above matrix formulation, the uplink transmission of data in the physical antenna ports 250 could be formulated as:

$$\begin{pmatrix} AP\ 1 \\ AP\ 2 \\ \vdots \\ AP\ M \end{pmatrix} = W \times P \times s,$$

where AP 1, AP 2, . . . , AP M and W are defined as above, where P is a 1 by M precoding vector from the fully coherent codebook subset 30, where s is a scalar representing the symbol of the rank 1 data stream to be transmitted, and where the operator x denotes matrix multiplication.

As a non-limiting example, assume that the radio access network node 140 selects the fully coherent precoder P=[1 . . . 1], which means that when this precoder is applied by the terminal device 200 for uplink transmission of data, the effective precoder will be W×P=[1 0 . . . 0] for W with all ones only in its first row. This means that the terminal device 200 will only transmit the uplink data in AP 1. Since the precoder is a full linear combining precoder, the power scaling allows for full output power at the PA of AP 1. The skilled person would understand how to generalize this example to a situation where W has all ones in row r, where 1≤r≤M.

As a further non-limiting illustrative example, assume that the terminal device 200 has two physical antenna ports, denoted AP 1, AP 2, each connected to omni-directional antennas and that the antennas of one of the physical antenna ports (for illustrative purposes assumed to be AP 2) is blocked and has therefore poor path gain. Assume further that at least the physical antenna port of the non-blocked antenna has a PA that is capable of highest output power (currently, 23 dBm). In this case, if the terminal device uses W as disclosed above the radio access network nod 140 select the precoder P=[1 1], where T denotes transpose, which means that the upcoming uplink transmission of data will be performed on the non-blocked antennas and with maximum allowed output power (currently, 23 dBm).

There could be different examples of uplink data. In some examples the uplink data is transmitted on a physical uplink shared channel (PUSCH). A fully coherent terminal device 200 might thus transmit PUSCH on only one of its physical antenna ports.

There could be different examples of uplink reference signals. According to an example, the uplink reference signals are sounding reference signals (SRS). In some aspects the uplink reference signals are transmitted over the 5G NR air interface.

Figure 6:
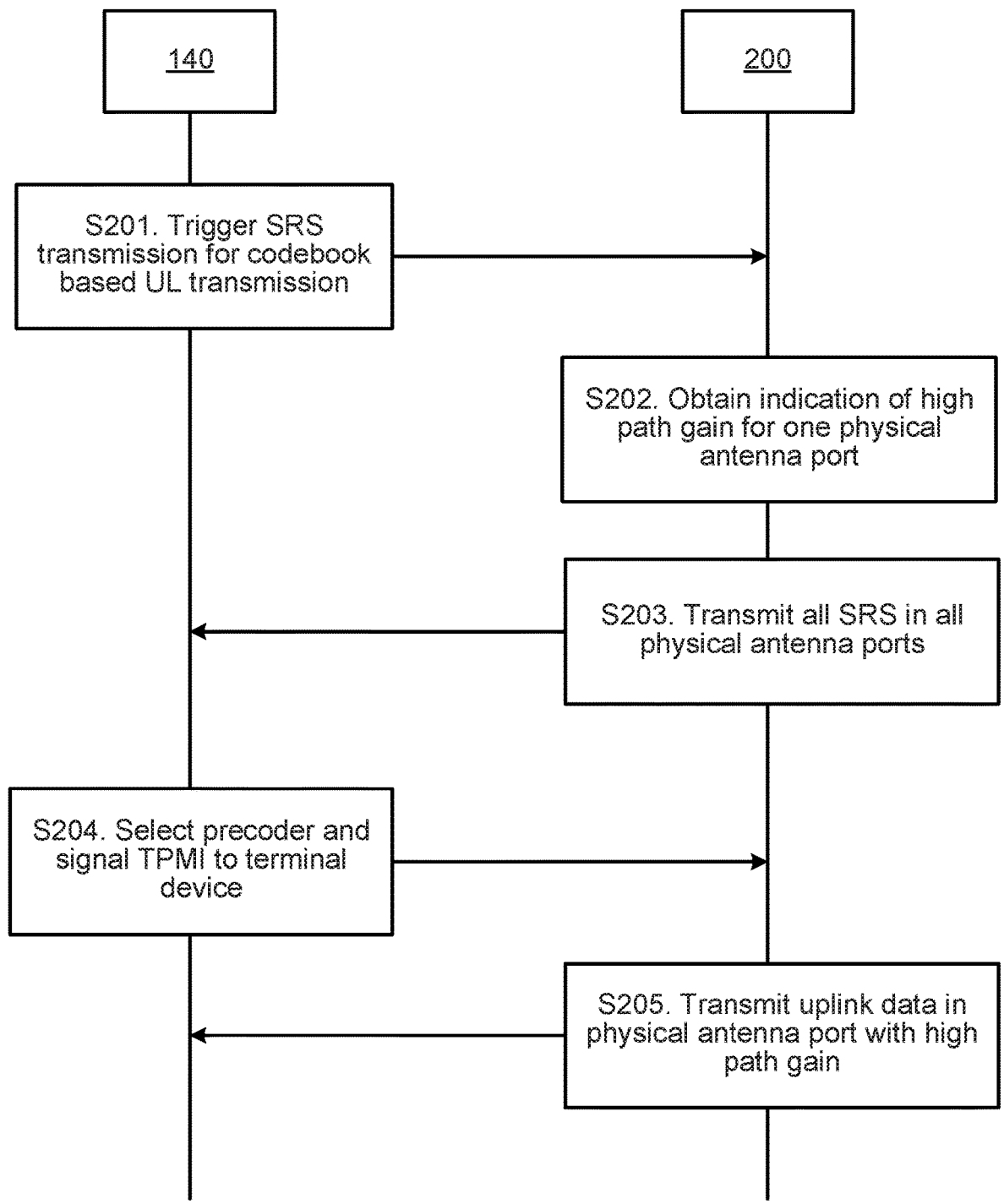
FIG. 6 is a signalling diagram of a method according to an embodiment.

One particular embodiment for transmission of reference signals based on at least some of the above disclosed embodiments will now be disclosed with reference to the signalling diagram of FIG. 6.

S201: The radio access network node 140 triggers the terminal device 200 to transmit the uplink reference signals for upcoming codebook based uplink transmission of data.

S202: The terminal device 200 obtains an indication of higher path gain being experienced in one of the physical antenna ports 250 than in the remaining physical antenna ports 250. The terminal device 200 could further check that the PA connected to that physical antenna port is capable of highest output power and that the terminal device 200 is in need of highest output power to enhance its coverage and/or user throughput.

S203: The terminal device 200 transmits, in all physical antenna port 250, as many uplink reference signals as there are physical antenna ports 250 in total.

S204: The radio access network node 140, upon reception of the uplink reference signals, selects a fully coherent precoder that when applied by the terminal device 200 will result uplink data transmission in only the single physical antenna port with the high path gain (and with the PA capable of highest output power). The decision of the selected precoder is signalled to the terminal device 200 in a TPMI report.

S205: The terminal device 200 applies the selected precoder when transmitting the uplink data such that the uplink data is transmitted only in the physical antenna port 250 experiencing the higher path gain.

Figure 7:
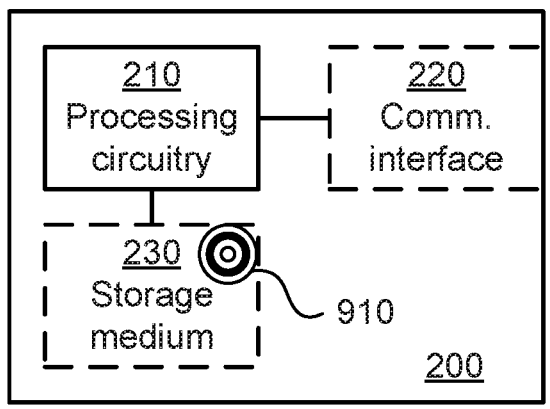
FIG. 7 is a schematic diagram showing functional units of a terminal device according to an embodiment.

FIG. 7 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with other entities, nodes, functions, and devices of the communication system 100. As such the communications interface 220 may comprise one or more transmitters and receivers, comprising analogue and digital components. The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 8:
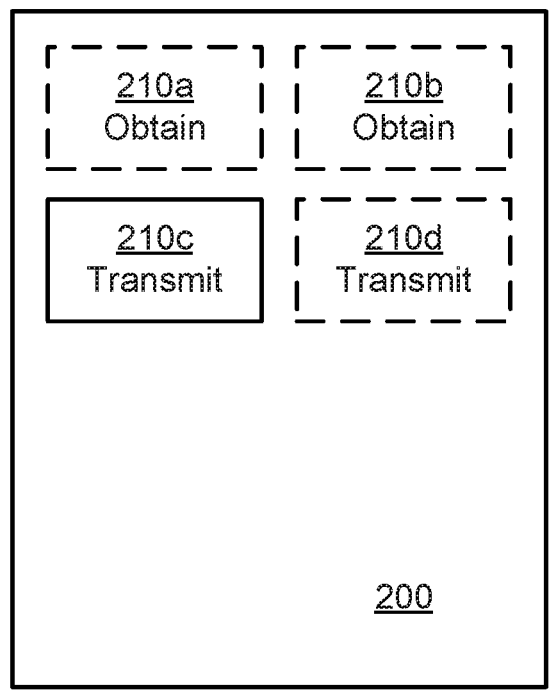
FIG. 8 is a schematic diagram showing functional modules of a terminal device according to an embodiment.

FIG. 8 schematically illustrates, in terms of a number of functional modules, the components of a terminal device 200 according to an embodiment. The terminal device 200 of FIG. 8 comprises a transmit module 210c configured to perform step S106. The terminal device 200 of FIG. 8 may further comprise a number of optional functional modules, such as any of an obtain module 210a configured to perform step S102, an obtain module 210b configured to perform step S104, and a transmit module 210d configured to perform step S108. In general terms, each functional module 210a-210d may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

Examples of terminal devices 200 have been given above.

Figure 9:
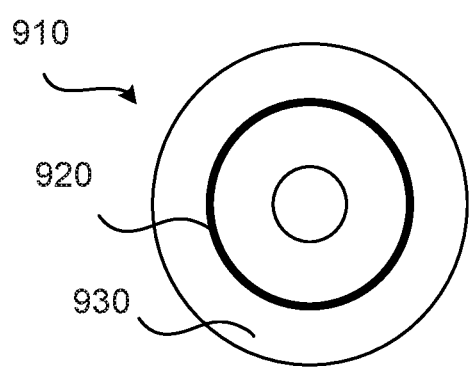
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of reference signals, the method being performed by a terminal device, the terminal device being configured for codebook based precoding and comprising at least two physical antenna ports, the method comprising:
transmitting, in all physical antenna port, as many uplink reference signals as there are physical antenna ports in total, wherein
there are M>1 physical antenna ports in total, and
the uplink reference signals SRS 1, SRS 2, ..., SRS M are transmitted from the physical antenna ports AP 1, AP 2, ..., AP M according to:

$$\begin{pmatrix} AP\ 1 \\ AP\ 2 \\ \vdots \\ AP\ M \end{pmatrix} = W \begin{pmatrix} SRS\ 1 \\ SRS\ 2 \\ \vdots \\ SRS\ M \end{pmatrix},$$

where W is an M by M matrix and has coefficients with unit amplitude in only one single row and in all other rows has coefficients with less than unit amplitude and where the coefficients within each of said all other rows have same amplitude, and further wherein
each physical antenna port is associated with a path gain, and
the method further comprises choosing the one single row with unit amplitude based on the path gains for each of the M physical antenna ports, wherein the one single row is chosen such that the one single row corresponds to the physical antenna port having the highest path gain.

2. The method of claim 1, wherein the terminal device is, according to the codebook based precoding, configured to use a codebook comprising antenna selection precoders, antenna pair selection precoders, and full linear combining precoders.

3. The method of claim 1, wherein each physical antenna port has its own transmit radio chain, and wherein the terminal device is configured to control relative phase of the transmit radio chains.

4. The method of claim 1, wherein W has coefficients being all ones in only one single row and in all other rows has coefficients selected from the set $\{-\alpha, +\alpha\}$.

5. The method of claim 4, wherein there are equally many occurring instances of $-\alpha$ and $+\alpha$ in each of said all other rows.

6. The method of claim 1, wherein there are four physical antenna ports in total, and wherein the uplink reference signals SRS 1, SRS 2, SRS 3, SRS 4 are transmitted from the physical antenna ports AP 1, AP 2, AP 3, AP 4 according to:

$$\begin{pmatrix} AP\ 1 \\ AP\ 2 \\ AP\ 3 \\ AP\ 4 \end{pmatrix} = W \begin{pmatrix} SRS\ 1 \\ SRS\ 2 \\ SRS\ 3 \\ SRS\ 4 \end{pmatrix},$$

where $$W = \begin{pmatrix} 1 & 1 & 1 & 1 \\ \alpha & -\alpha & \alpha & -\alpha \\ \alpha & \alpha & -\alpha & -\alpha \\ \alpha & -\alpha & -\alpha & \alpha \end{pmatrix}$$

or any row-wise permutations thereof.

7. The method of claim 1, wherein there are two physical antenna ports in total, and wherein the uplink reference signals SRS 1, SRS 2 are transmitted from the physical antenna ports AP 1, AP 2 according to:

$$\begin{pmatrix} AP\ 1 \\ AP\ 2 \end{pmatrix} = W \begin{pmatrix} SRS\ 1 \\ SRS\ 2 \end{pmatrix},$$

where $$W = \begin{pmatrix} 1 & 1 \\ \alpha & -\alpha \end{pmatrix}$$

or any row-wise permutations thereof.

8. The method of claim 4, wherein $0<\alpha<1$.

9. The method of claim 1, wherein each physical antenna port is operatively connected, via its own power amplifier, to only a single antenna element or an array of at least two antenna elements.

10. The method of claim 9, wherein the antenna element or array of at least two antenna elements of at least two of the physical antenna ports are arranged at the terminal device to point in at least two mutually different pointing directions.

11. The method of claim 1, further comprising:
obtaining an indication from a radio access network node for the terminal device to transmit the uplink reference signals, and wherein the reference signals are transmitted in response thereto.

12. The method of claim 1, further comprising:
obtaining an indication of higher path gain being experienced in one of the physical antenna ports than in the remaining physical antenna ports, and wherein the uplink reference signals are transmitted in response thereto.

13. The method of claim 12, further comprising:
transmitting, in only the physical antenna port experiencing the higher path gain, uplink data.

14. The method of claim 13, wherein the uplink data is transmitted on a physical uplink shared channel, PUSCH.

15. The method of claim 13, wherein the uplink reference signals are transmitted over the 5G New Radio, NR, air interface.

16. The method of claim 1, wherein the uplink reference signals are sounding reference signals, SRS.

17. A terminal device for transmission of reference signals, the terminal device being configured for codebook based precoding and comprising at least two physical antenna ports, the terminal device further comprising processing circuitry, the processing circuitry being configured to cause the terminal device to:
transmit, in all physical antenna port, as many uplink reference signals as there are physical antenna ports in total, wherein
there are M>1 physical antenna ports in total, and
the uplink reference signals SRS 1, SRS 2, . . . , SRS M are transmitted from the physical antenna ports AP 1, AP 2, . . . , AP M according to:

$$\begin{pmatrix} AP\ 1 \\ AP\ 2 \\ \vdots \\ AP\ M \end{pmatrix} = W \begin{pmatrix} SRS\ 1 \\ SRS\ 2 \\ \vdots \\ SRS\ M \end{pmatrix},$$

where W is an M by M matrix and has coefficients with unit amplitude in only one single row and in all other rows has coefficients with less than unit amplitude and where the coefficients within each of said all other rows have same amplitude, and further wherein each physical antenna port is associated with a path gain, and the terminal device is further configured to choose the one single row with unit amplitude based on the path gains for each of the M physical antenna ports, wherein the one single row is chosen such that the one single row corresponds to the physical antenna port having the highest path gain.

18. A terminal device for transmission of reference signals, the terminal device being configured for codebook based precoding and comprising at least two physical antenna ports, the terminal device further comprising:
a transmit module configured to transmit, in all physical antenna port, as many uplink reference signals as there are physical antenna ports in total, wherein
there are M>1 physical antenna ports in total, and
the uplink reference signals SRS 1, SRS 2, . . . , SRS M are transmitted from the physical antenna ports AP 1, AP 2, . . . , AP M according to:

$$\begin{pmatrix} AP\ 1 \\ AP\ 2 \\ \vdots \\ AP\ M \end{pmatrix} = W \begin{pmatrix} SRS\ 1 \\ SRS\ 2 \\ \vdots \\ SRS\ M \end{pmatrix},$$

where W is an M by M matrix and has coefficients with unit amplitude in only one single row and in all other rows has coefficients with less than unit amplitude and where the coefficients within each of said all other rows have same amplitude, and further wherein each physical antenna port is associated with a path gain, and the terminal device is configured to choose the one single row with unit amplitude based on the path gains for each of the M physical antenna ports, wherein the one single row is chosen such that the one single row corresponds to the physical antenna port having the highest path gain.

19. The terminal device of claim 17, further being configured to use a codebook comprising antenna selection precoders, antenna pair selection precoders, and full linear combining precoders.

20. A computer program product comprising a non-transitory computer readable medium storing a computer program, the computer program comprising computer code which, when run on processing circuitry of a terminal device being configured for codebook based precoding and comprising at least two physical antenna ports, causes the terminal device to:
transmit, in all physical antenna port, as many uplink reference signals as there are physical antenna ports in total, wherein
there are M>1 physical antenna ports in total, and
the uplink reference signals SRS 1, SRS 2, . . . , SRS M are transmitted from the physical antenna ports AP 1, AP 2, . . . , AP M according to:

$$\begin{pmatrix} AP\ 1 \\ AP\ 2 \\ \vdots \\ AP\ M \end{pmatrix} = W \begin{pmatrix} SRS\ 1 \\ SRS\ 2 \\ \vdots \\ SRS\ M \end{pmatrix},$$

where W is an M by M matrix and has coefficients with unit amplitude in only one single row and in all other rows has coefficients with less than unit amplitude and where the coefficients within each of said all other rows have same amplitude, and further wherein each physical antenna port is associated with a path gain, and the computer program further configures the terminal device to choose the one single row with unit amplitude based on the path gains for each of the M physical antenna ports, wherein the one single row is chosen such that the one single row corresponds to the physical antenna port having the highest path gain.

* * * * *

UNITED STATES PATENT AND TRADEMARK OFFICE
CERTIFICATE OF CORRECTION

PATENT NO. : 11,139,870 B2
APPLICATION NO. : 16/466242
DATED : October 5, 2021
INVENTOR(S) : Petersson et al.

It is certified that error appears in the above-identified patent and that said Letters Patent is hereby corrected as shown below:

In the Specification

In Column 6, Line 53, delete "base" and insert -- based --, therefor.

Signed and Sealed this
Tenth Day of May, 2022

*Katherine Kelly Vidal*

Katherine Kelly Vidal
*Director of the United States Patent and Trademark Office*